US011630227B1

(12) United States Patent
Pan et al.

(10) Patent No.: US 11,630,227 B1
(45) Date of Patent: Apr. 18, 2023

(54) METHOD AND SYSTEM FOR RECOGNIZING MINE MICROSEISMIC EVENT

(71) Applicant: LIAONING UNIVERSITY, Shenyang (CN)

(72) Inventors: Yishan Pan, Shenyang (CN); Linlin Ding, Shenyang (CN); Lujie Cao, Shenyang (CN); Hanlin Zhang, Shenyang (CN); Hao Luo, Shenyang (CN)

(73) Assignee: LIAONING UNIVERSITY, Shenyang (CN)

( * ) Notice: Subject to any disclaimer, the term of this patent is extended or adjusted under 35 U.S.C. 154(b) by 0 days.

(21) Appl. No.: 17/860,297

(22) Filed: Jul. 8, 2022

(30) Foreign Application Priority Data

Mar. 21, 2022 (CN) .......................... 202210281630.5

(51) Int. Cl.
*G01V 1/34* (2006.01)
*G01V 1/28* (2006.01)

(52) U.S. Cl.
CPC .............. *G01V 1/345* (2013.01); *G01V 1/282* (2013.01); *G01V 1/288* (2013.01)

(58) Field of Classification Search
CPC ......... G01V 1/345; G01V 1/282; G01V 1/288
See application file for complete search history.

(56) References Cited

U.S. PATENT DOCUMENTS

| 10,048,702 | B1 * | 8/2018 | Florence | G01V 1/288 |
| 10,458,231 | B2 * | 10/2019 | Nguyen | E21B 49/006 |
| 10,634,803 | B2 * | 4/2020 | Pugh | G01V 1/008 |
| 11,043,101 | B2 * | 6/2021 | He | E21F 17/18 |

* cited by examiner

*Primary Examiner* — Elias Desta
(74) *Attorney, Agent, or Firm* — Maine Cernota & Rardin

(57) ABSTRACT

Embodiments of the present disclosure provide a method and system for recognizing a mine microseismic event, and belong to the field of mine data processing. The method includes: converting historical microseismic data monitored by a mine microseismic monitoring system into a microseismic waveform image, and then, converting the microseismic waveform image into a four-neighborhood microseismic waveform graph structure; performing area defining on the microseismic waveform graph structure, and extracting a similar feature layer of any node in the microseismic waveform graph structure based on the defined area; and taking the microseismic waveform image as an input layer of an improved convolutional neural network model, and sequentially connecting the input layer with the similar feature layer as well as a convolutional layer, a pooling layer, a fully connected layer and an output layer which are pre-configured for the improved convolutional neural network model to form a recognition model for recognizing the mine microseismic event. By using the recognition model designed in the present disclosure, the similar feature layer can be extracted, so that the mine microseismic event is effectively recognized.

20 Claims, 9 Drawing Sheets

METHOD AND SYSTEM FOR RECOGNIZING MINE MICROSEISMIC EVENT

CROSS REFERENCE TO RELATED APPLICATIONS

This application claims priority to Chinese Application No. CN202210281630.5, filed on Mar. 21, 2022, entitled "METHOD AND DEVICE FOR RECOGNIZING MINE MICROSEISMIC EVENT, and MEDIUM", which is specifically and entirely incorporated by reference.

FIELD OF THE INVENTION

The present disclosure relates to the field of mine data processing, in particular to a method and system for recognizing a mine microseismic event.

BACKGROUND OF THE INVENTION

Mine microseism refers to rock stratum vibration generated by rapid release of a great deal of energy gathered on surrounding rock due to sudden change of stress in a mine and stress around the mine under the action of a stress field of the surrounding rock in a mining process. The mine microseism is an induced earthquake occurring in the mining process, wherein high-energy mine microseism is one of hazards of the mine, and once it occurs, serious damage to life and property safety will be caused. The mine microseism mainly occurs in a mining area where the geologic structure is relatively complicated, the structural stress is higher and obvious fault activities occur and is relatively complicated in both cause of formation and waveform features. On one hand, mine microseism may be caused by exploitation activities in mining areas underground and on the ground, if less mining-induced seismicity occurs, no seisesthesia is brought to the ground, and if greater mining-induced seismicity occurs, there is strong seisesthesia on the ground. On the other hand, mine microseism may also be caused by mine roof caving, coal-seam rib spalling, ground collapse, pressure bump, coal and gas outburst and the like. Therefore, the monitoring for the mine microseism is very important.

At present, a mine microseismic monitoring system has been applied to coal mine monitoring, by which a great deal of microseismic data may be continuously generated, and the data may be used for recognizing a mine microseismic event. However, in order to solve the problem about the accuracy rate of recognition for the mine microseismic event, many solution methods, such as time frequency analysis, multi-parameter combined recognition and machine learning, applied to the mine microseismic monitoring system have appeared in recent years, but these methods have great application limitations due to the problem such as inaccurate recognition for the microseismic event and time complexity increment caused by large parameter number.

SUMMARY OF THE INVENTION

Purposes of embodiments of the present disclosure are to provide a method and system for recognizing a mine microseismic event, and a medium to at least partially solve the above-mentioned technical problem.

In order to achieve the above-mentioned purposes, embodiments of the present disclosure provide a method for recognizing a mine microseismic event, including: monitoring historical microseismic data by a mine microseismic monitoring device; and performing the following steps by a calculation device.

The following steps comprises: converting the historical microseismic data monitored by the mine microseismic monitoring device into a microseismic waveform image, and then, converting the microseismic waveform image into a four-neighborhood microseismic waveform graph structure; performing area defining on the microseismic waveform graph structure, and extracting a similar feature layer of any node in the microseismic waveform graph structure based on the defined area, wherein a feature of each node is represented by RGB information of k similar nodes of the node, and the similar feature layer refers to k layers of similar nodes formed by arranging the k similar nodes in ascending order of similarity, wherein k is an integer greater than 1; and taking the microseismic waveform image as an input layer of an improved convolutional neural network model, and sequentially connecting the input layer with the similar feature layer as well as a convolutional layer, a pooling layer, a fully connected layer and an output layer which are pre-configured for the improved convolutional neural network model to form a recognition model for recognizing the mine microseismic event.

Preferably, each node in the microseismic waveform graph structure is expressed as $v=[x, f]^T$, wherein $x=[u,v]$ represents pixel coordinates of the node, and $f=[R, G, B]$ respectively represents pixel values of three RGB channels corresponding to a pixel.

Preferably, performing area defining on the microseismic waveform graph structure comprises: determining a pixel value of a diagonal node in the microseismic waveform graph structure by virtue of a first subgraph with a preset size; judging whether an area corresponding to the subgraph is a blank area according to the determined pixel value; and defining a non-blank area in the microseismic waveform graph structure as an area for extracting the similar feature layer.

Preferably, extracting a similar feature layer of any node in the microseismic waveform graph structure based on the defined area comprises: selecting an extraction area defined by a second subgraph whose size is smaller than the size of the first subgraph in the defined area; calculating similarities between any node in the extraction area and other nodes by adopting a non-recursive SimRank algorithm; and determining the similar feature layers of the corresponding nodes according to a size order of the calculated similarities.

Preferably, the convolutional layer is configured to comprise a feature map which is composed of a plurality of neurons, and the feature map is expressed as the following formula:

$$C_{m,n}^{p,q} = \sigma\left(\sum_{m=1}^{m}\sum_{n=1}^{n} I_{(m-u,n-v)} \cdot K_{u,v}^{p,q} + b^{p,q}\right)$$

wherein $b^{p,q}$ represents a bias value corresponding to the feature map, $\sigma$ represents an ReLU function, $$K_{u,v}^{p,q}$$

represents a convolution kernel, and $I_{(m-u,n-v)}$ represents a pixel position where the convolution kernel is located.

Preferably, the pooling layer is configured to: divide the feature map input to the pooling layer from the convolutional layer into a plurality of local areas, and determine an average value or maximum value of all the neurons within each local area for output.

Preferably, the number of the convolutional layers, the pooling layers and the fully connected layers is one or more, and the number of combined layers of the convolutional layers and the pooling layers which are connected ahead the fully connected layers is one or more.

Preferably, all the neurons in the fully connected layer are fully connected with all the neurons of a pooling layer ahead the fully connected layer, and the connection between the fully connected layer and the pooling layer ahead the fully connected layer may be further achieved by: cascading and converting an output feature map of the pooling layer ahead the fully connected layer into a vector with an adaptive length, and taking the vector as an input of the fully connected layer. Preferably, after the recognition model for recognizing the mine microseismic event is formed, the method for recognizing a mine microseismic event further comprises: correcting weights and biases of a plurality of model parameters of the formed recognition model; and testing the corrected model by using a preset test set, and processing the real-time microseismic waveform image by using the recognition model tested to be qualified so as to recognize the microseismic event.

Preferably, correcting weights and biases of a plurality of model parameters of the formed recognition model comprises: performing forward propagation training on the recognition model to obtain an output error of the recognition model; and performing back propagation training on the output error, and applying a random gradient descent algorithm in the back propagation training to correct the weights and the biases of the recognition model.

Embodiments of the present disclosure further provide a machine-readable storage medium, wherein the machine-readable storage medium stores an instruction, and the instruction is used for enabling a machine to execute any above-mentioned method for recognizing a mine microseismic event in the present application.

Embodiments of the present disclosure further provide a system for recognizing a mine microseismic event. The system includes: a mine microseismic monitoring device for monitoring historical microseismic data, a processor, a memory and a program stored on the memory and capable of running on the processor, and the program is executed by the processor to implement the following steps:

Converting the historical microseismic data into a microseismic waveform image, and then, converting the microseismic waveform image into a four-neighborhood microseismic waveform graph structure;

Performing area defining on the microseismic waveform graph structure, and extracting a similar feature layer of any node in the microseismic waveform graph structure based on the defined area, wherein a feature of each node is represented by RGB information of k similar nodes of the node, and the similar feature layer refers to k layers of similar nodes formed by arranging the k similar nodes in ascending order of similarity, wherein k is an integer greater than 1;

Taking the microseismic waveform image as an input layer of an improved convolutional neural network model, and connecting the input layer with the similar feature layer as well as a convolutional layer, a pooling layer, a fully connected layer and an output layer which are pre-configured for the improved convolutional neural network model sequentially to form a recognition model for recognizing the mine microseismic event.

Preferably, each node in the microseismic waveform graph structure is expressed as $v=[x, f]^T$, wherein $x=[u, v]$ represents pixel coordinates of the node, and $f=[R, G, B]$ respectively represents pixel values of three RGB channels corresponding to a pixel.

Preferably, the convolutional layer $$C_{m,n}^{p,q}$$

is configured to comprise a feature map which is composed of a plurality of neurons, and the feature map of the convolutional layer $$C_{m,n}^{p,q}$$

is expressed as the following formula:

$$C_{m,n}^{p,q} = \sigma\left(\sum_{m=1}^{m}\sum_{n=1}^{n} I_{(m-u,n-v)} \cdot K_{u,v}^{p,q} + b^{p,q}\right)$$

wherein $b^{p,q}$ represents a bias value corresponding to the feature map, $\sigma$ represents an ReLU function, $$k_{u,v}^{p,q}$$

represents a convolution kernel, and $I_{(m-u,n-v)}$ represents a pixel position where the convolution kernel is located.

Preferably, the pooling layer is configured to: divide the feature map input to the pooling layer from the convolutional layer into a plurality of local areas, and determine an average value or maximum value of all the neurons within each local area for output.

Preferably, the number of the convolutional layers, the pooling layers and the fully connected layers is one or more, and the number of combined layers of the convolutional layers and the pooling layers which are connected ahead the fully connected layers is one or more.

Preferably, all the neurons in the fully connected layer are fully connected with all the neurons of a pooling layer ahead the fully connected layer, and the connection between the fully connected layer and the pooling layer ahead the fully connected layer may be further achieved by: cascading and converting an output feature map of the pooling layer ahead the fully connected layer into a vector with an adaptive length, and taking the vector as an input of the fully connected layer.

Preferably, after the recognition model for recognizing the mine microseismic event is formed, the program is also executed by the processor to further implement: correcting weights and biases of a plurality of model parameters of the formed recognition model; and testing the corrected model by using a preset test set, and processing the real-time microseismic waveform image by using the recognition model tested to be qualified so as to recognize the microseismic event.

Preferably, wherein correcting weights and biases of a plurality of model parameters of the formed recognition model comprises: performing forward propagation training on the recognition model to obtain an output error of the recognition model; and performing back propagation training on the output error, and applying a random gradient descent algorithm in the back propagation training to correct the weights and the biases of the recognition model.

Preferably, performing area defining on the microseismic waveform graph structure comprises: determining a pixel value of a diagonal node in the microseismic waveform graph structure by virtue of a first subgraph with a preset size; judging whether an area corresponding to the subgraph is a blank area according to the determined pixel value; and defining a non-blank area in the microseismic waveform graph structure as an area for extracting the similar feature layer.

Preferably, extracting a similar feature layer of any node in the microseismic waveform graph structure based on the defined area comprises: selecting an extraction area defined by a second subgraph whose size is smaller than the size of the first subgraph in the defined area; calculating similarities between any node in the extraction area and other nodes by adopting a non-recursive SimRank algorithm; and determining the similar feature layers of the corresponding nodes according to a size order of the calculated similarities.

According to the above-mentioned technical solutions, for solving the problem that the accuracy rate of recognition for the microseismic event is not high in an existing CNN method, an improved-CNN-based recognition model for a mine microseismic event is designed. By using the recognition model, the extraction of the similar feature layer and the feature extraction of image data can be achieved, the characteristics of high efficiency and accuracy are achieved, and the mine microseismic event can be effectively recognized.

Other features and advantages of the embodiments of the present disclosure will be explained in detail in the subsequent section of Detailed Description of the Embodiments.

BRIEF DESCRIPTION OF DRAWINGS

The accompanying drawings are provided for further understanding of the embodiments of the present disclosure, and constitute one part of the description. They serve to explain embodiments of the present disclosure in conjunction with the following implementations, rather than to limit the present disclosure. In the accommodating drawings.

DETAILED DESCRIPTION OF THE EMBODIMENTS

Implementations of embodiments of the present disclosure will be described in detail below in conjunction with the accompanying drawings. It should be understood that the implementations described herein are merely intended to describe and explain the embodiments of the present disclosure, rather than to limit the embodiments of the present disclosure.

It should be noted that the definitions of some concepts involved in the embodiments of the present disclosure are as follows:

1. microseismic waveform graph structure: the microseismic waveform graph structure may be expressed as a four-neighborhood undirected graph G=(v, e), wherein v represents a node in the undirected graph, each pixel in the waveform image is taken as a node, e represents information of edges between the nodes, and the edges are directly or indirectly formed between the nodes;

2. large subgraph and small subgraph: 1) based on the above-mentioned definition of the microseismic waveform graph structure, the large subgraph may be expressed as G'=(v',e'), wherein G'∈G,v'∈v, e ∈e, and v' and e' respectively represent information of the nodes and the edges in the large subgraph; and 2) the small subgraph is smaller than the large subgraph in size and may be expressed as G"=(v",e"), wherein G"∈v', e"∈e, and v' and e" respectively represent information of the nodes and the edges in the small subgraph; and 3. non-recursive SimRank algorithm: two nodes $v_1$ and $v_2$ in the graph structure G are given, and the non-recursive SimRank algorithm for $v_1$ and $v_2$ is expressed by the following formulae (1) and (2):

$$Sim(v_1, v_2) = \begin{cases} 1, & \text{if } v_1 = v_2 \\ \frac{c}{|I(v_1)||I(v_2)|} \sum_{i=1}^{|I(v_1)|} \sum_{j=1}^{|I(v_2)|} \rho(I_i(v_1)I_j(v_2)), & \text{otherwise} \end{cases} \quad (1)$$

$$\rho(I_i(v_1)I_j(v_2)) = 1 - \|I_i(v_1) - I_j(v_2)\| = \\ 1 - \sqrt{\frac{(I_i(v_1)_R - I_j(v_2)_R)^2 + (I_i(v_1)_G - I_j(v_2)_G)^2 + (I_i(v_1)_B - I_j(v_2)_B)^2}{3}} \quad (2)$$

wherein $|I(v_1)|$ and $|I(v_2)|$ respectively represent degrees of $v_1$ and $v_2$; $I_i(v_1)$ and $I_j(v_2)$ respectively represent the $i^{th}$ neighborhood of $v_1$ and the $i^{th}$ neighborhood of $v_2$; c represents a decay factor between 0 and 1; and an $Sim(v_1, v_2)$ algorithm focuses on information of an adjacent node.

Embodiment 1

Embodiment 1 of the present disclosure provides a method for recognizing a mine microseismic event, which is proposed based an inventive concept: from the perspective of an image, historical microseismic data monitored by a mine microseismic monitoring device is used to construct a recognition model for recognizing the mine microseismic event by applying a concept of a deep learning Convolutional Neural Network (CNN).

Figure 1:
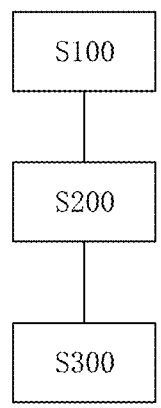
FIG. 1 is a flowchart of a method for recognizing a mine microseismic event in embodiment 1 of the present disclosure.

Based on the above-mentioned inventive concept, FIG. 1 is a flowchart of a method for recognizing a mine microseismic event in embodiment 1 of the present disclosure, wherein the method may be performed by a calculation device. As shown in FIG. 1, the method for recognizing a mine microseismic event may include the following steps.

Step S100, converting historical microseismic data monitored by a mine microseismic monitoring device into a microseismic waveform image, and then, converting the microseismic waveform image into a four-neighborhood microseismic waveform graph structure.

Wherein, the mine microseismic monitoring device is, for example, the SOS microseismic monitoring system, and the SOS system has been installed in many mines and used to monitor mine seismic signals. That is, in the step S100, original data is preprocessed to obtain the four-neighborhood microseismic waveform graph structure for constructing the recognition model.

As for converting the historical microseismic data into the microseismic waveform image, for example, an average value of numerical values of three components xyz (corresponding to RGB of the image) of the microseismic data of an original time sequence may be solved by virtue of MATLAB to draw the microseismic waveform image.

As for converting the microseismic waveform image into the four-neighborhood microseismic waveform graph structure, for example, the microseismic waveform graph structure may be expressed as a four-neighborhood undirected graph G=(v, e) with reference to the above-mentioned definition of the microseismic waveform graph structure, and each node in the undirected graph G may be expressed as $v=[x, f]^T$, wherein $x=[u, v]$ represents pixel coordinates of the node, and $f=[R, G, B]$ respectively represents pixel values of three RGB channels corresponding to a pixel, wherein u and v respectively represent the number of columns and rows where the corresponding node is located in an image array.

Step S200, performing area defining on the microseismic waveform graph structure, and extracting a similar feature layer of any node in the microseismic waveform graph structure based on the defined area.

It is apparent that the step S200 may be divided into two parts: step S210 of area defining; and step S220 of extracting a similar feature layer, wherein the concept of the similar feature layer will be described below in combination with examples.

In a preferred embodiment, the step S210 of area defining may include the following steps S211 to S213:

Step S211, determining a pixel value of a diagonal node in the microseismic waveform graph structure by virtue of a first subgraph with a preset size;

Step S212, judging whether an area corresponding to the first subgraph is a blank area according to the determined pixel value.

For example, the pixel value of a diagonal node $v_{m,n}$ (m=n) is found by virtue of a subgraph with a size of 50×50 to judge whether the area is a blank area according to the pixel value and to further judge whether the data is event data, and then, the effect of lowering the time complexity of the algorithm may be achieved.

Step S213, defining a non-blank area in the microseismic waveform graph structure as an area for extracting the similar feature layer.

The first subgraph with the preset size is the large subgraph defined as above. The blank area in the graph structure is judged by virtue of the large subgraph, for example, according to the description of judgment of the blank area in the above-mentioned step S212, the pixel value of the diagonal node is found by virtue of a large subgraph with a specific size to judge whether the area is the blank area and to further judge whether the data is microseismic event data.

Herein, by area defining, the blank area may no longer participate in the construction of the recognition model, and thus, the event complexity of the algorithm to be applied subsequently may be lowered.

In a preferred embodiment, the step S220 of extracting a similar feature layer may include the following steps S221 to S223:

Step S221, selecting an extraction area defined by a second subgraph whose size is smaller than the size of the first subgraph in the defined area;

Step S222, calculating similarities between any node in the extraction area and other nodes by adopting a non-recursive SimRank algorithm; and Step S223, determining the similar feature layers of the corresponding nodes according to a size order of the calculated similarities.

The second subgraph whose size is smaller than the size of the first subgraph is the small subgraph defined above. In order to illustrate details of extracting the similar feature layer in the defined area by virtue of the small subgraph, the definition corresponding to the similar feature layer in the steps S221 to S223 is firstly given herein. That is, a feature of each node is represented by RGB information of k similar nodes of the node. For example, for feature description of each node, the feature of the node is represented by RGB information of k nodes most similar to the node. The feature of each node i in the graph structure is expressed as $F=[f_1, f_2, \ldots, f_k]T$, wherein $f_1, f_2, \ldots f_k$ represent RGB information of k nodes $v_1, v_2, \ldots v_k$ similar to the node i. And therefore, the similar feature layer refers to k layers of similar nodes formed by arranging the k similar nodes in ascending order of similarity, wherein k is an integer greater than 1.

Therefore, the similar feature layer in the defined area is extracted by virtue of the small subgraph, for example, if other areas except the blank area are selected, a specific area of the small subgraph is selected, and any node i in the graph G is given, similarities between the nodes are solved according to the non-recursive SimRank algorithm, the obtained similarities between the k similar nodes and any node meet the condition of Simi1>Simi2> . . . >Simik, k nodes $v_1, v_2, \ldots v_k$ corresponding to each node may be found for each node and are sequentially used as the nodes on positions corresponding to the first to $k^{th}$ layers, and after a similar feature layer of a three-channel color RGB image is extracted, 3k similar feature layers (namely R/G/B) are finally extracted.

Step S300, taking the microseismic waveform image as an input layer of an improved convolutional neural network (SimCNN) model, and sequentially connecting the input layer with the similar feature layer as well as a convolutional layer, a pooling layer, a fully connected layer and an output layer which are pre-configured for the improved convolutional neural network model to form a recognition model for recognizing the mine microseismic event. It should be noted that the SimCNN model is a model obtained by improving a CNN model, also applying the non-recursive SimRank algorithm and combining the CNN model with the non-recursive SimRank algorithm, and is an innovated model in the embodiments of the present disclosure.

That is, the recognition model (a structural diagram of an example model is involved in the following examples) formed by sequentially connecting the input layer, the similar feature layer, the convolutional layer, the pooling layer and the fully connected layer is constructed, so that the mine microseismic event is recognized in a real-time microseismic waveform image. The recognition model is an improved CNN model and applies the non-recursive SimRank algorithm so as to be called the SimCNN model herein. The plurality of layers of the SimCNN model will be specifically introduced below.

1) Input layer: the input layer is used for inputting a to-be-recognized microseismic waveform image.

2) Similar feature layer: as mentioned above, the similar feature layer is used to process the microseismic waveform image provided by the input layer to obtain required similar features.

3) Convolutional layer: the original data image is extracted by similar features to obtain a similar feature layer, and then enters the convolution layer. In the embodiment of the present disclosure, the convolutional layer is composed of a plurality of feature maps, and each feature map is composed of a plurality of neurons, wherein each neuron is connected with local areas of the feature map of the previous layer by a convolution kernel. In a discrete three-dimensional color image space, the image and the convolution kernel are respectively defined as three-dimensional tensors of (H,W,C) and ($k_1$, $k_2$, c), wherein c represents a channel of a color, and m and n represent spatial coordinates and respectively represent pixels in the $m^{th}$ row and the $n^{th}$ column on the $c^{th}$ image channel. The number of layers of the feature maps obtained on the convolutional layer is the same as the number of the convolution kernels. When one of the convolution kernels performs sliding operation on a color image I, the convolution operation of a multi-dimensional tensor may be expressed as:

$$(I \otimes K)_{ij} = \sum_{m=1}^{m}\sum_{n=1}^{n}\sum_{c=1}^{c} K_{m,n,c} I_{i+m,j+n,c} \quad (3)$$

wherein K represents a convolution kernel, and i and j represent abscissa and ordinate of a pixel.

The size (length and width) of each output feature map of each convolutional layer meets the following relationship:

$$\begin{cases} height_{ij} = \dfrac{height_{mn} - height_k + 2 \times padding}{stride} + 1 \\ width_{ij} = \dfrac{width_{mn} - width_k + 2 \times padding}{stride} + 1 \end{cases} \quad (4)$$

wherein height represents a height, width represents a width, padding represents a padding value, and step-size represents a step-size. For example, when a convolution kernel $$k_{u,v}^{p,q}$$

slides to a position $I_{m,n}$ on a color image, its convolution step-size is 1, and it is padded with 0. Therefore, a feature map of a convolutional layer $$C_{m,n}^{p,q}$$

in me embodiment of me present disclosure may be expressed as:

$$C_{m,n}^{p,q} = \sigma\left(\sum_{m=1}^{m}\sum_{n=1}^{n} I_{(m-u,n-v)} \cdot K_{u,v}^{p,q} + b^{p,q}\right)$$

wherein $b^{p,q}$ represents a bias value corresponding to an output feature map, σ represents an ReLU function and may be expressed as σ(x)=max(0, x), represents a convolution kernel, and $I_{(m-u,n-v)}$ represents a pixel position where the convolution kernel is located, wherein u and v represent pixel levels of the convolution kernel, and m and n represent spatial coordinates on a color image. It should be noted that the ReLU function can solve the vanishing gradient and exploding gradient problems and may also increase a convergence rate as comparison with a linear activation function. 4) Pooling layer: the pooling layer is connected behind the convolutional layer, and is composed of a plurality of feature maps, the number of the feature maps is the same as that of the convolutional layers, and feature maps of the pooling layer are in one-to-one correspondence to the convolutional layer ahead the pooling layer. The pooling layers are mainly used to reduce dimensions of the feature maps and compress the feature maps to avoid overfitting and achieve the effect of secondary feature extraction.

In the embodiment of the present disclosure, the pooling layer is configured to divide the feature maps input to the pooling layer from the convolutional layer into a plurality of local areas, and determine an average value or maximum value of all the neurons within each local area for output. A plurality of local areas may overlap or not overlap. In addition, based on the mentioned average value or maximum value, there may be two pooling functions:

a) an average pooling function which is used for solving the average value of all the neurons within the local area; and b) a maximum pooling function which is used for solving the maximum value of all the neurons within the local area and may be expressed by a formula:

$$P_{m,n}^{p,q} = \max\left(C_{m,n}^{p,q}\right) \quad (5)$$

wherein p, q, m and n represent the selected local areas for pooling.

It should be noted that there is the concept of step-size in both the pooling layer and the convolutional layer. For example, pooled feature maps are gradually obtained by the moving step-size of a pooling window. Therefore, by virtue of a pooling operation, the number of the neurons is greatly reduced, that is, the number of connections between the convolutional layers is reduced, meanwhile, model parameters are also greatly lowered, the calculated amount of the network model is reduced, and the running efficiency is increased.

5) Fully connected layer: after the feature extraction of a plurality of convolutional layers and pooling layers, one or more fully connected layers need to be added in the end of the model, and all the neurons in the fully connected layer are fully connected with all the neurons of the pooling layer ahead the fully connected layer. The fully connected layer is capable of integrating local information with category differences in the convolutional layer and the pooling layer and takes charge of further reducing the dimensions of the features and purifying the features.

In addition, the connection between the fully connected layer and the pooling layer ahead the fully connected layer may be further achieved by: cascading and converting an output feature map of the pooling layer ahead the fully connected layer into a vector with an adaptive length, and taking the vector as an input of the fully connected layer. For example, an output feature map of a pooling layer $$P_{m,n}^{p,q}$$

may be cascaded and converted into a vector with a length p×q, the vector is taken as an input of the fully connected layer, a vectorized data point on a I–1 layer is expressed as $a_i^{I-1} = f(P^{p,q})$ if there are I fully connected layers in total, and there are n neurons on each layer, then a calculation process of the fully connected layers is expressed by the formula:

$$z_i^l = w_{i1}^l a_i^{l-1} + w_{i2}^l a_i^{l-1} + \cdots + w_{ij}^l a_i^{l-1} + \cdots + b_j^l \quad (6)$$

An output value of an activated neuron j on the $I^{th}$ layer is expressed as:

$$a_j^l = \sigma\left(\sum_{i=1}^n w_{ij}^l a_j^{l-1} + b_i^l\right) \quad (7)$$

6) Output layer: the output layer serves as the last layer and is used for outputting a prediction probability that waveform data is microseismic data.

As above, the SimCNN model is constructed. However, in a more preferred embodiment, the number of all the layers may be selected actually. For example, the number of the convolutional layers, the pooling layers and the fully connected layers is one or more, and the number of combined layers of the convolutional layers and the pooling layers which are connected ahead the fully connected layers may also be one or more.

To sum up, the embodiment 1 of the present disclosure designs the improved-CNN-based recognition model for the mine microseismic event, namely the SimCNN model by which the extraction of the similar feature layer and the feature extraction of image data can be achieved, the characteristics of high efficiency and accuracy are achieved, and the mine microseismic event can be effectively recognized.

Embodiment 2

Generally, after the recognition model is designed, training and testing should be further performed to ensure the accuracy of the model. Based such a concept, embodiment 2 of the present disclosure provides an improved method for recognizing a mine microseismic event.

Figure 2:
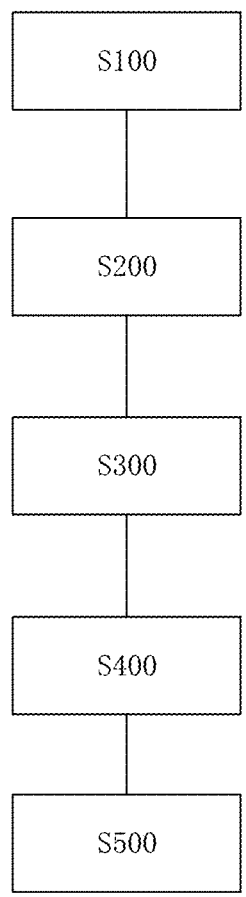
FIG. 2 is a flowchart of a method for recognizing a mine microseismic event in embodiment 2 of the present disclosure.

FIG. 2 is a flowchart of a method for recognizing a mine microseismic event in embodiment 2 of the present disclosure. On the basis of the steps S100 to S300 in FIG. 1, the method further includes the following steps S400 and S500.

Step S400, correcting weights and biases of a plurality of model parameters of the formed recognition model.

That is, the model parameters of the SimCNN model formed in the embodiment 1 are corrected, and the model parameters include, for example, the input layer, the similar feature layer, the convolutional layer, the pooling layer, the fully connected layer, the output layer, learning rate and the number of times of training. Preferably, a correction method may include: performing forward propagation training on the recognition model to obtain an output error of the recognition model; and performing back propagation training on the output error, and applying a random gradient descent algorithm in the back propagation training to correct the weights and the biases of the recognition model. A forward propagation algorithm and a back propagation algorithm which are applicable to the correction method will be specifically introduced below.

1) The Forward Propagation Algorithm.

An error, namely a value of a loss function is forwards propagated. Values of the weights and the biases of all the parameters of the SimCNN model are randomly initialized, a forward propagation process is associated with the step S300, that is, the image data input to the SimCNN model needs to be processed by the similar feature layer, the convolutional layer, the pooling layer and the fully connected layer (namely a feature extraction process). For the forward propagation algorithm, an output value obtained after processing in the step S300 is extended to a classification layer (for outputting a classification result), if L represents the number of the fully connected layers, and L+1 represents the classification layer, an output predicted value of a neuron i on the classification layer L+1 is expressed as:

$$\hat{y}_i^{L+1} = \sigma(W^L \ldots \ldots \sigma(W^2(\sigma(W^1 a^1 + b^1) + b^2 \ldots \cdots + b^L)) \quad (8)$$

wherein a sample label is set as $y_i$, and the loss function adopts a cross-entropy loss function expressed as follows:

$$L(\hat{y}_i^{L+1}, y_i) = -\frac{1}{t}\sum_{1}^{i=t}((y_i)\log(\hat{y}_i^{L+1}) + (1 - y_i)\log(1 - \hat{y}_i^{L+1})) \quad (9)$$

wherein the sample label is a result set obtained by labeling each training sample in the model according to their classification; the loss function is used for estimating the degree of inconsistency between a predicted value and a real value of the model and is a non-negative real-valued function; and the smaller the loss function, the better the robustness of the model.

2) The Back Propagation Algorithm.

The back propagation algorithm means that the random gradient descent algorithm is adopted to gradually correct the values of the weights and the biases with specific to the error value obtained by using the forward propagation algorithm, so that the most appropriate value is found. In a back propagation process, a partial derivative on each layer is calculated based on a chain rule, and then, the gradient of the loss function is solved. Specifically, a gradient of a loss function with respect to a weight and a bias on the last layer is calculated firstly, and then, a gradient of a loss function with respect to a weight and a bias on the first layer is gradually calculated in a reverse direction. By using the back propagation algorithm, the value of the loss function is lowered, so that the parameters of each layer in the convolutional neural network are gradually updated. For example, a partial derivative $$\frac{\partial L(\hat{y}_i^{L+1}, y_i)}{\partial \hat{y}_i^{L+1}}$$

of a loss function with respect to a predicted value $$\hat{y}_i^{L+1}$$

of the $i^{th}$ neuron on the $(L+1)^{th}$ layer is calculated; a partial derivative of a loss function with respect to a weight $$w_{i,j}^L$$

of the $i^{th}$ neuron on the $L^{th}$ layer is expressed as $$\frac{\partial L(\hat{y}_i^{L+1}, y_i)}{\partial w_{i,j}^L},$$

an activation function also selects the ReLU function, then, the function is derived as $$\sigma'(z) = \begin{cases} 0 & z < 0 \\ 1 & z \geq 0 \end{cases},$$

and a partial derivative of a loss function with respect to a bias $$b_i^L$$

of the $i^{th}$ neuron on the $L^{th}$ layer is expressed as $$\frac{\partial L(\hat{y}_i^{L+1}, y_i)}{\partial b_i^L}.$$

The pooling layer plays major roles in reducing the dimension and reducing overfitting, and therefore, parameters of the pooling layer do not change. The parameters $$\frac{\partial L(\hat{y}_i^{L+1}, y_i)}{\partial C_{m,n}^{p,q}} = P^{p,q}$$

of the pooling layer may be obtained by an upsampling operation, a partial derivative of a loss function with respect to a parameter $$k_{u,v}^{p,q}$$

of the convolution kernel is expressed as $$\frac{\partial L(\hat{y}_i^{L+1}, y_i)}{\partial k_{m,n}^{p,q}},$$

and a partial derivative of a loss function with respect to a bias $b^{p,q}$ of the convolution kernel is expressed as $$\frac{\partial L(\hat{y}_i^{L+1}, y_i)}{\partial b^{p,q}}.$$

In order to minimize the loss function, the value of the weights and the biases need to be updated, the random gradient descent algorithm is adopted to correct the parameters, and formulae $$W^{L+1} - \alpha \frac{\partial L(\hat{y}_i^{L+1}, y)}{\partial w^L} \text{ and } b^{L+1} = b^{L+1} - \alpha \frac{\partial L(\hat{y}_i^{L+1}, y)}{\partial w^L}$$

respectively represent updating processes of a weight W and a bias b, wherein a represents a learning rate.

Therefore, an image training set is repeatedly trained in two processes including forward propagation and back propagation, so that the loss function is continuously reduced, then, the model parameters are gradually corrected, and thus, the accurate recognition model for the mine microseismic event is obtained by training.

Step S500, testing the corrected model by virtue of a preset test set, and processing a real-time microseismic waveform image by virtue of the recognition model tested to be qualified so as to recognize the microseismic event.

For example, the complete simCNN-based recognition model for the mine microseismic event is obtained by forward and back propagation training in the step S400; the model is tested by using a test set, so that the recognition accuracy of the model is determined; and finally, the trained recognition model for the mine microseismic event is loaded, so that the microseismic event is accurately recognized with specific to an input microseismic waveform.

To sum up, in combination with the embodiment 1 and the embodiment 2, the embodiments of the present disclosure form the sequential data of the monitored waveform into an image, convert the sequential data into a three-dimensional image and then perform training and testing to obtain a recognition model for a mine microseismic signal, which is higher in recognition accuracy rate, thereby being beneficial to the achievement of the accurate recognition and classification for the mine microseismic event.

Applications and effects of the method for recognizing a mine microseismic event in the above-mentioned two embodiments will be further described by an example. In the example, a model for a microseismic event of a certain mine in Shanxi is constructed, and a recognition effect of the model is verified.

Figure 3:
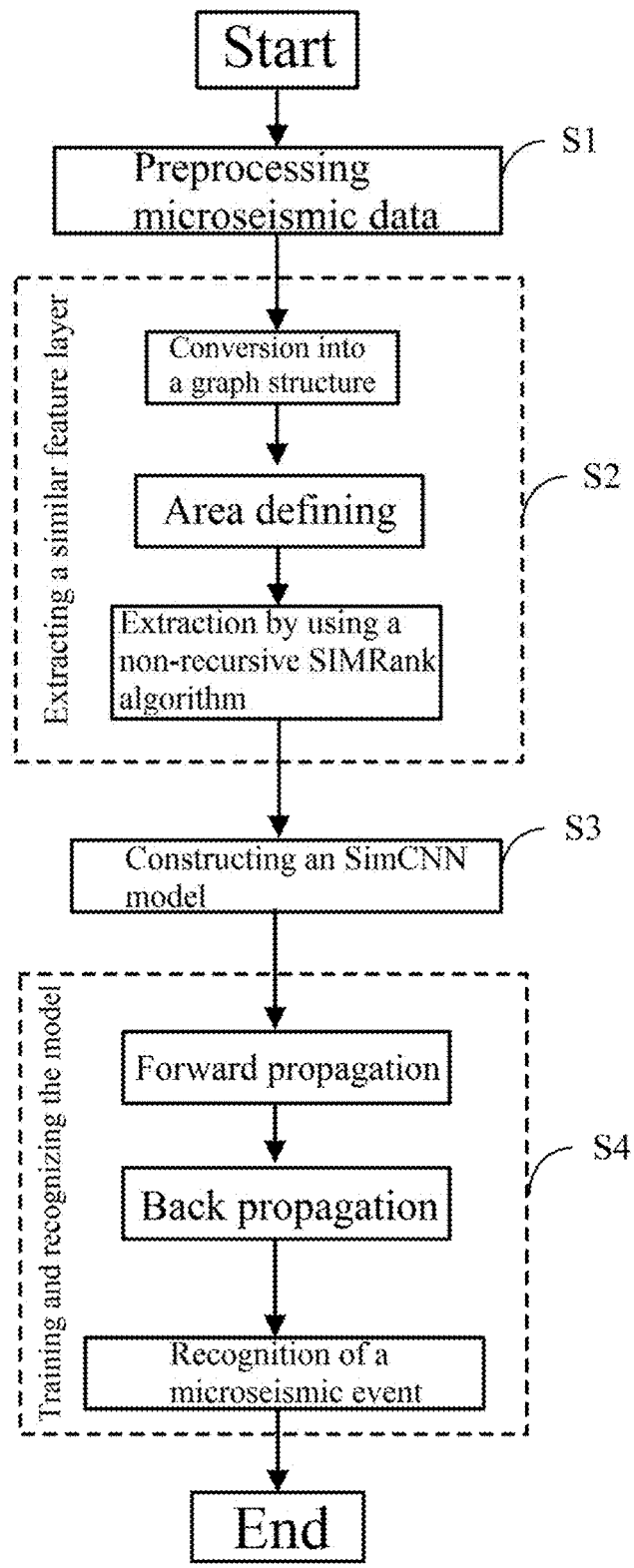
FIG. 3 is a flowchart of recognizing a mine microseismic event in an example of an embodiment of the present disclosure.

FIG. 3 is a flowchart of recognizing a mine microseismic event in an example of an embodiment of the present disclosure. The process includes the following steps.

Step S1, preprocessing microseismic data.

Figure 4A:
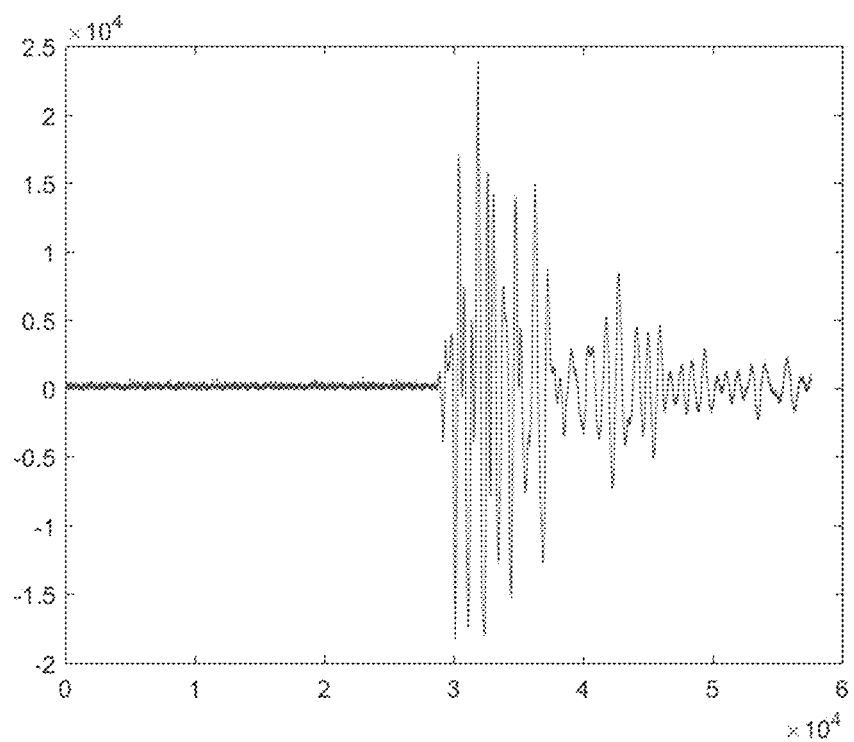
FIG. 4(a) and FIG. 4(b) are schematic diagrams of a microseismic data set in an example of an embodiment of the present disclosure.
Figure 4B:
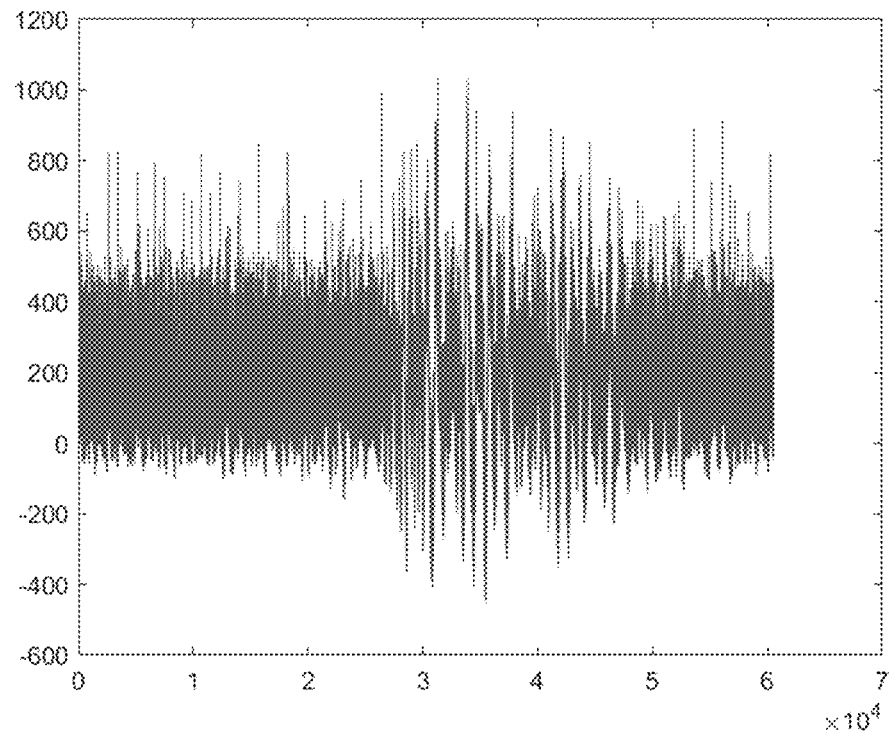

A data set in the example is from a continuous waveform record of a mine microseismic monitoring device, and data is divided into event and noise categories. In the aspect of the event category, waveform fragments within 5s before and after the arrival of a wave P are manually captured from a continuous waveform, wherein each fragment includes 50000 sampling points; and in the aspect of the noise category, a method for random screening and capturing after an event waveform is eliminated is adopted, and all samples of event data and noise data are unified within 10s. Further, the obtained mine microseismic data includes numeral values of three components xyz, an average value of the numerical values of the three components is solved by virtue of MATLAB, a waveform image is drawn, then, an original image of which the pixel value is 875*656 is converted into a size of 100*100, and thus, a microseismic data set as shown in FIG. 4(a) and FIG. 4(b) is obtained, wherein FIG. 4(a) shows the event data, and FIG. 4(b) shows the noise data.

In addition, experimental data to be used in the subsequent steps is divided into 148 training sets and 46 test sets, and corresponding labels are made for the data, wherein a label of the microseismic event data is set as "1", and a label of the noise data is set as "0".

Step S2, extracting a similar feature layer of the SimCNN.

Figure 5A:
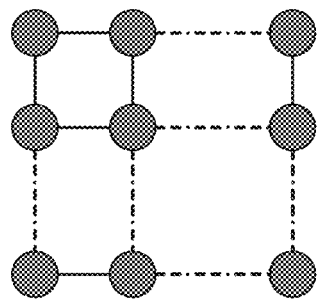
FIG. 5(a) and FIG. 5(b) are schematic diagrams of a principle of extracting a similar feature layer in an example of an embodiment of the present disclosure.
Figure 5B:
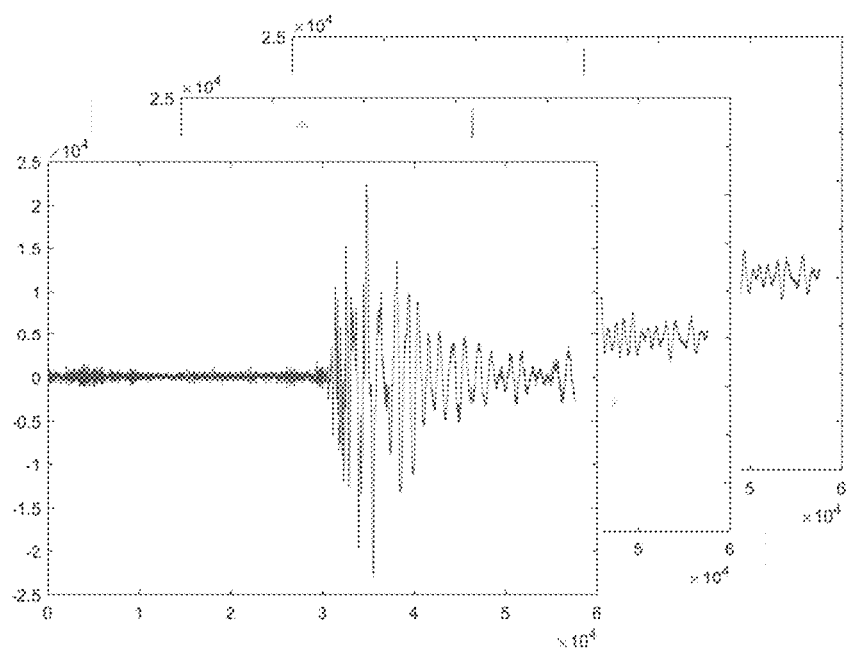

A process of extracting the similar feature layer of the SimCNN is shown according to an order from FIG. 4(a) to FIG. 5(a) to FIG. 5(b), wherein FIG. 4(a) to FIG. 5(a) show conversion from an input image to a graph structure, and FIG. 5(a) to FIG. 5(b) show the extraction of the similar feature layer.

The specific extraction of the similar feature layer may be described as follows.

1) The input layer is a three-channel RGB image with a size of 100*100*3 obtained by data preprocessing and is used as an input of a CNN.

Figure 6A:
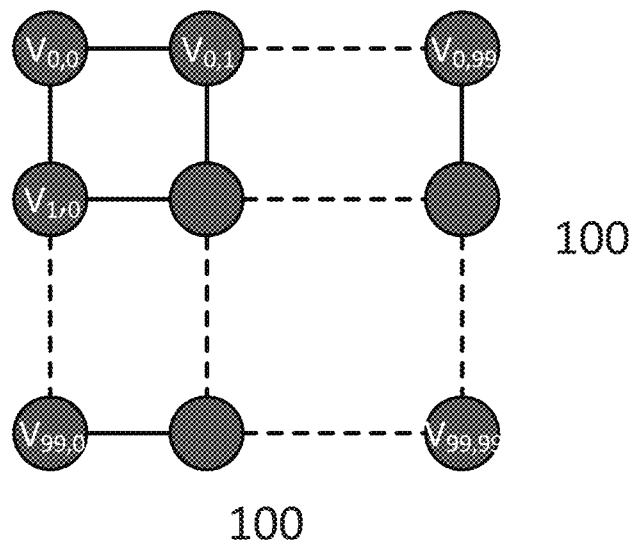
FIG. 6(a) is a schematic diagram of a large subgraph in an example of an embodiment of the present disclosure.

2) Next, the similar feature layer is extracted: firstly, the image is converted into a four-neighbourhood graph structure, as shown in FIG. 6(a), and nodes in the figure are expressed as $v_{i,j}, i, j \in (0,99)$.

3) Then, a blank area in the figure is judged by virtue of a large subgraph, a specified regional node is found by virtue of a subgraph with a size of 30*30, a pixel value of a diagonal node $v_{ij}$, (i=j and ij $\in$ (0,29)) is found, and thus, an area where the pixel value is equal to 255 is the blank area and is the microseismic event data, otherwise, the pixel value is the noise data. According to characteristics of the noise data, if the pixel value is the noise data, 100*100 nodes need to be calculated; and if the pixel value is the event data, only nodes obtained after the blank area is removed need to be calculated.

Figure 6B:
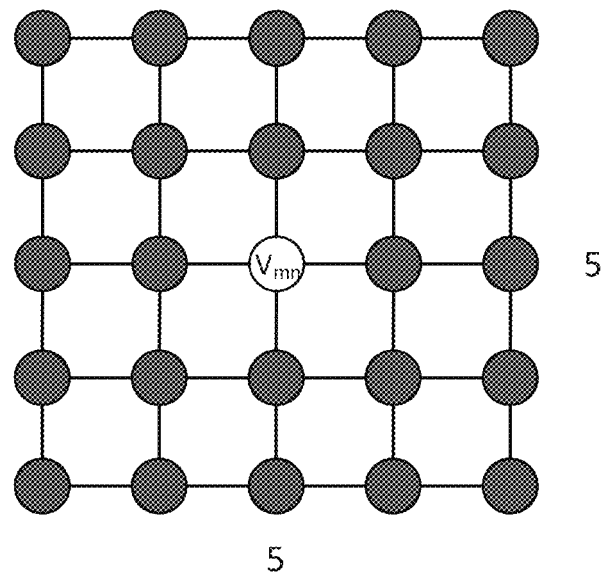
FIG. 6(b) is a schematic diagram of a small subgraph in an example of an embodiment of the present disclosure.

4) The similar feature layer is extracted by virtue of a small subgraph with a size of 5*5 as shown in FIG. 6(b), a central node of any small subgraph is expressed as $v_{mn}$, similarities between the central node and other nodes within a range of the small subgraph are solved by using a non-recursive SimRank algorithm, k nodes similar to the central node $v_{mn}$, are found, with the similarities meeting the condition of Sim1>Sim2> ... >Simk, k nodes $v_1, v_2, \ldots v_k$ corresponding to each central node may be found for each central node and are sequentially used as the nodes on positions corresponding to the first to $k^{th}$ layers, and 3k similar feature layers with a size of 100*100*3k are finally extracted.

Step S3, constructing an SimCNN model.

Figure 7:
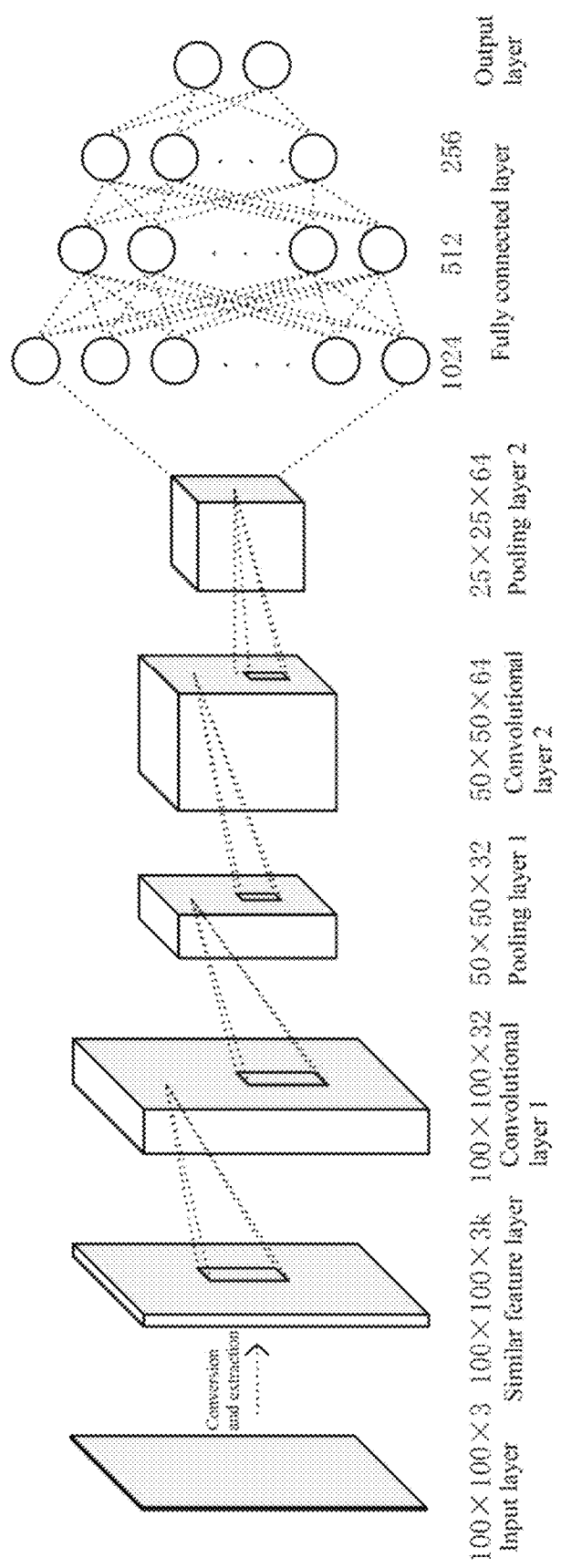
FIG. 7 is a schematic diagram of an improved-CNN-based recognition model for a mine microseismic event in an example of an embodiment of the present disclosure.

An improved-CNN-based recognition model for a mine microseismic event is shown in FIG. 7, and the model is mainly a simCNN model constructed by a similar feature layer, convolutional layers, pooling layers and fully connected layers and specifically includes an input layer, a similar feature layer, two convolutional layers, two pooling layers, fully connected layers and an output layer. The convolutional layers are used for acquiring local features of a microseismic image, performing convolution operation on a feature map of the similar feature layer and performing convolution operation on feature maps of the pooling layers, wherein the convolutional layer 1 adopts 32 convolution kernels with a size of 3*3 and a step-size of 1, and the convolutional layer 2 adopts 64 convolution kernels with a size of 3*3 and a step-size of 1. Both the convolutional layer 1 and the convolutional layer 2 are operated by using the maximum pooling function, and downsampling is performed by adopting a filter with a size of 2*2 and a step-size of 2 in all the maximum pooling operations. The fully connected layers are used for reconnecting all local features by virtue of a weight matrix into a complete image, and the three fully connected layers respectively include 1024 neurons, 512 neurons and 256 neurons, wherein each neuron is connected with two layers located ahead and behind. The output layer is connected with the last fully connected layer, and two neurons respectively output a prediction probability that two types of waveform data are microseismic data.

Step S4, training and recognizing the model.

A model training process may include:

1) The model is trained by using a training set, wherein an activation function is an ReLU function expressed as $\sigma(x) = \max(0, x)$;

2) Classification is performed by using a softmax function expressed as $$\text{Softmax}(z_i) = \frac{\exp(z_i)}{\sum_j \exp(z_j)},$$

wherein $z_i$ and $z_j$ represent elements of a vector z, and the softmax function may be used to normalize original data of the previous layer, wherein the data becomes decimals within a range (0, 1) by normalization, so that data processing is facilitated, and then, the data is converted into a probability value within the range (0, 1);

3) A parameter learning rate (wherein the parameter learning rate is used for showing a learning progress of a control model) is set as 0.0005, an epoch (one epoch represents a process that all training samples are trained once) is set as 50 and 100, and the SimCNN-based recognition model for the microseismic event is obtained by forward and back propagation training.

Further, after the training is completed, the model is tested by virtue of the test set, so that the accuracy of the model is determined, and finally, the model is used for accurately recognizing the mine microseismic event.

Furthermore, in the example, the above-mentioned method is tested mainly in four aspects which will be respectively described as follows.

1) Influences of change of value of k on recognition accuracy rate and loss function of model.

Figure 8:
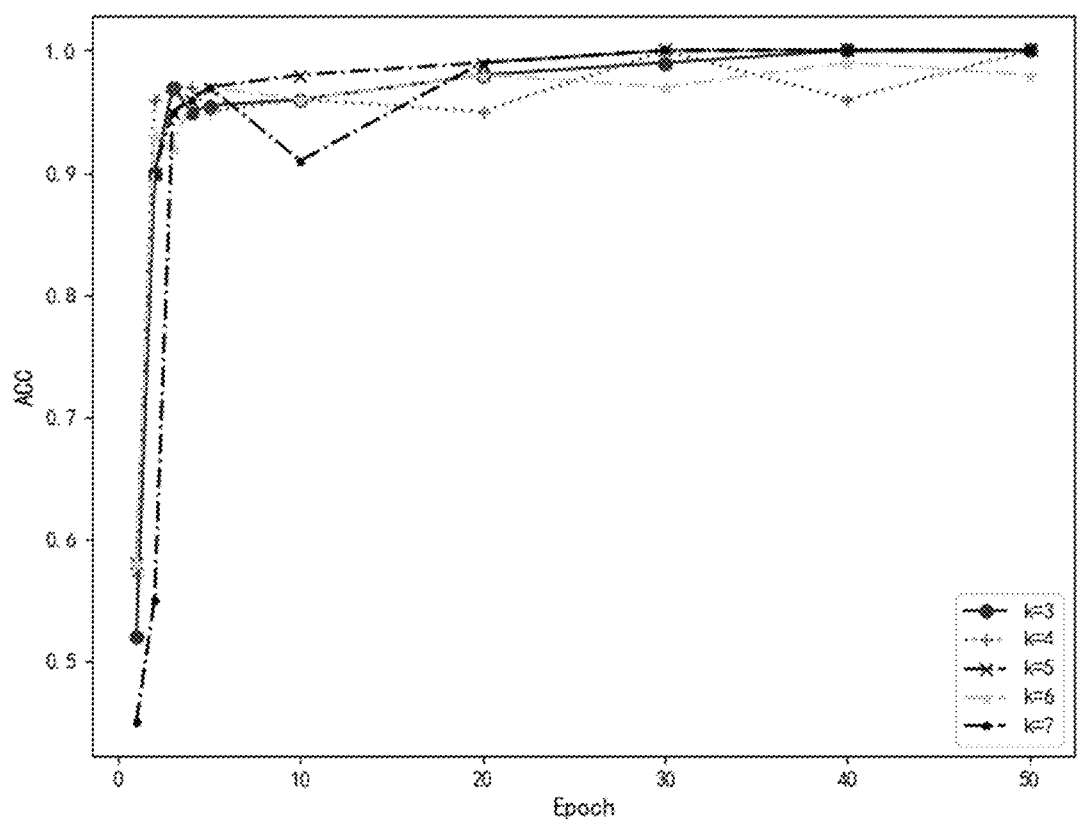
FIG. 8 is a schematic diagram of a recognition accuracy rate of a recognition model for a microseismic event in an example of an embodiment of the present disclosure.
Figure 9:
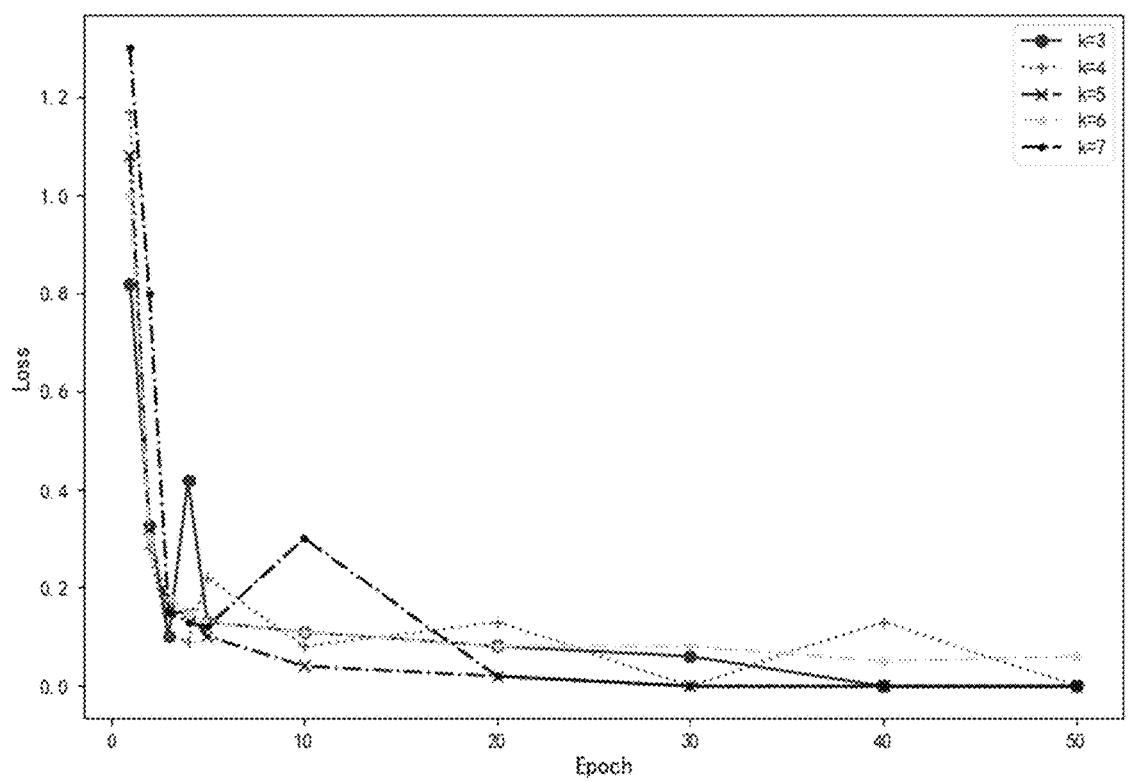
FIG. 9 is a schematic diagram of a recognition loss function of a recognition model for a microseismic event in an example of an embodiment of the present disclosure.

FIG. 8 shows the comparison of the recognition accuracy rate of the recognition model for the microseismic event when the values of k are different, as a whole, when the epoch is greater than or equal to 10, a curve tends to be stable, and the recognition accuracy rate may reach more than 95%; and when epoch=10 and the value of k is 5, a corresponding accuracy rate curve converges firstly and is close to 1. FIG. 9 is a comparison diagram of a loss function of the recognition model for the microseismic event, as a whole, for the five curves, when the Epoch is greater than or equal to 10, the model starts to be close to 0; to sum up, the curve meeting k=5 is more stable than other curves, rapidest in convergence and ideal in both the accuracy rate and the loss function.

2) Comparison of accuracy rates and loss functions between SimCNN and CNN.

Figure 10:
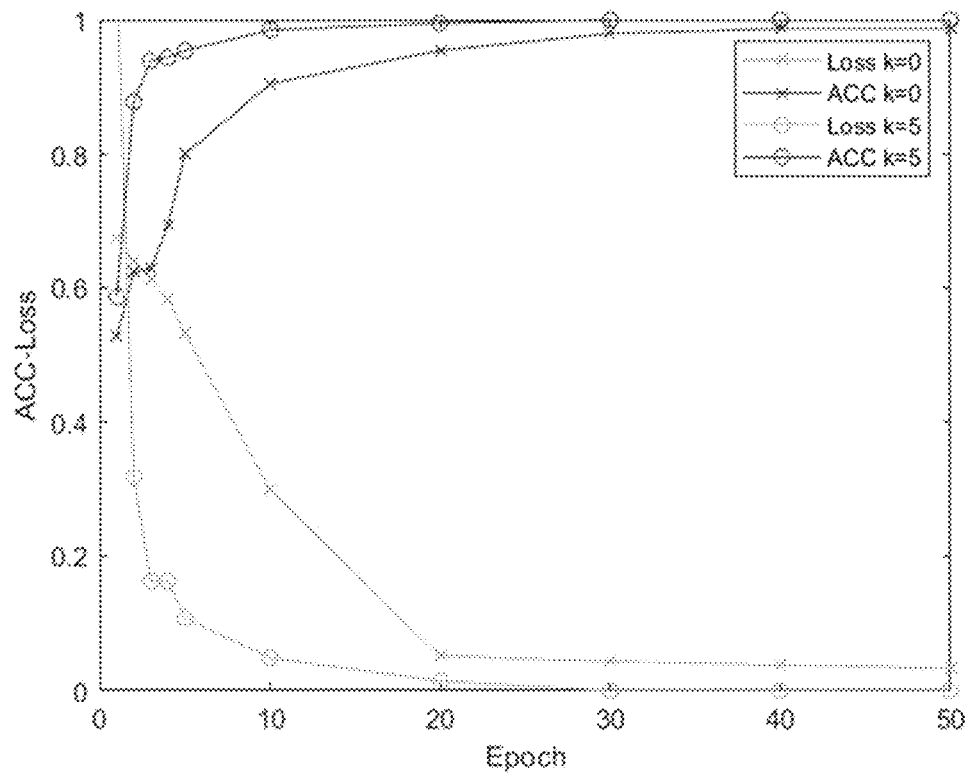
FIG. 10 is a schematic diagram of a result of influences of the addition of a similar feature layer on an original convolution neural network structural model in an example of an embodiment of the present disclosure.

With k=5 as an example, influences of the addition of the similar feature layer on an original CNN structural model are researched to obtain experimental comparison results shown in FIG. 10 in which two broken lines meeting k=0 respectively represent a recognition accuracy rate and a loss function of a training set when no similar feature layer is added, wherein Loss represents the loss function, and ACC represents the recognition accuracy rate. The comparison research shows that after the similar feature layer is added, the accuracy rate of the model converges more rapidly and is increased, and the loss function is lowered more rapidly and is close to 0, which proves that image features may be extracted more rapidly by the recognition model for the microseismic event of the mine after the similar feature layer of the data image is extracted, so that effective features may be further extracted from the subsequent layers such as the convolutional layers and the pooling layers by extracting and thickening the original feature map.

3) Training results of recognition model for mine microseismic event.

Figure 11:
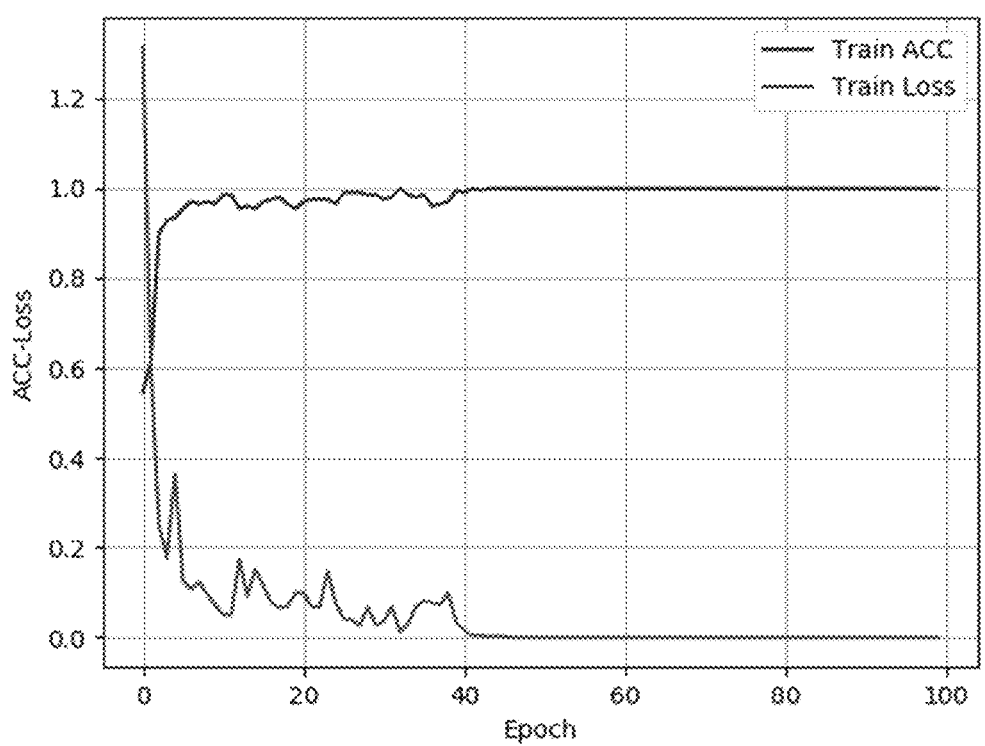
FIG. 11 is a schematic diagram of the change of a training accuracy rate and a loss function of a recognition model for a mine microseismic event in an example of an embodiment of the present disclosure.

FIG. 11 is a schematic diagram of the change of a training accuracy rate and a loss function of a recognition model for a mine microseismic event. A Train ACC curve located above represents an accuracy rate of a training set, and a Train Loss curve located below represents a loss function of the training set. It can be seen from the figure that, when the number of iterations is smaller than 10, the accuracy rate in the overall curve shows an obvious ascending tendency; and when the number of iterations is greater than 10, an accuracy rate curve tends to be stable and is kept above 0.95. Similarly, for the loss function, when the number of iterations is smaller than 30, there is an obvious descending phenomenon in a loss function curve; and when the number of iterations is greater than 30, the curve slowly tends to be stable, and the loss function is kept at about 0.05.

4) Test results of recognition model for mine microseismic event.

The following table shows a testing accuracy rate of the recognition model for the mine microseismic event.

| Training set | Test ACC |
| --- | --- |
| For the first time | 0.9334 |
| For the second time | 0.9667 |
| For the third time | 0.9667 |
| For the fourth time | 0.9334 |
| For the fifth time | 1.0000 |
| For the sixth time | 0.9667 |

After the model is trained, a model document is saved, then, test sets are tested, and the model is restored to a state every time when the training is ended. In an experiment, 46 sets of data are used as the test sets, and data of the test sets does not overlap with data of the training sets. Cross validation is adopted for the data of the training sets, during each test, 30 sets of data are randomly selected to test the model for six times, and thus, the accuracy rate may reach more than 95%. The effectiveness of the method in the embodiment of the present disclosure may be seen from an experimental result. By adding the similar feature layer to the CNN, the recognition accuracy rate of the model is increased, and the microseismic event can be effectively recognized.

An embodiment of the present disclosure further provides a machine readable storage medium, wherein the machine readable storage medium stores an instruction, and the instruction is used for enabling a machine to execute any above-mentioned method for recognizing a mine microseismic event in the present application.

An embodiment of the present disclosure further provides a processor used for enabling a program to run, wherein when the program is executed, any above-mentioned method for recognizing a mine microseismic event is executed.

An embodiment of the present disclosure provides a system for recognizing a mine microseismic event. The system includes: a mine microseismic monitoring device for monitoring historical microseismic data; and a processor, a memory and a program stored on the memory and capable of running on the processor, and when the program is executed by the processor, any above-mentioned method for recognizing a mine microseismic event is implemented. The system described herein may be a server, a PC, a PAD, a mobile phone and the like. Please note that for the details of the method implemented by the program, reference may be made to the above embodiments, which will not be repeated here.

The processor includes a kernel which calls corresponding program units in the memory. One or more kernels may be disposed, and any above-mentioned method for recognizing a mine microseismic event is executed by adjusting kernel parameters.

The memory may include a volatile memory, a random access memory (RAM) and/or a non-volatile memory or other forms, such as a read-only memory (ROM) or a flash memory (flash RAM), in a computer readable medium. The memory includes at least one memory chip.

The present application further provides a computer program product which is suitable for executing a program initialized with the steps of any above-mentioned method for recognizing a mine microseismic event when being executed on a data processing device.

It should be understood by the skilled in the art that the embodiments of the present application may be provided as a method, system or computer program product. Therefore, forms of an entirely hardware embodiment, an entirely software embodiment or a software and hardware combined embodiment may be adopted in the present application. Moreover, a form of a computer program product executed on one or more computer available storage media (including, but not limited to a magnetic disk memory, a CD-ROM and an optical memory) including computer available program codes may be adopted in the present application.

The present application is described by referring to flowcharts and/or block diagrams of the method, device (system) and computer program product according to the embodiments of the present application. It should be understood that each flow and/or block in the flowcharts and/or block diagrams as well as a combination of flows and/or blocks in the flowcharts and/or block diagrams may be achieved by computer program instructions. The computer program instructions may be provided to a general-purpose computer, a special-purpose computer, an embedded processor or processors of other programmable data processing devices to generate a machine, so that an apparatus for achieving specified functions in one or more flows in the flowcharts and/or one or more blocks in the block diagrams is generated through the instructions executed by the computer or the processors of other programmable data processing devices.

These computer program instructions may also be stored in a computer readable memory capable of guiding the computer or other programmable data processing devices to work in a specific manner, so that the instructions stored in the computer readable memory generate an article of manufacture including an instruction apparatus, and the instruction apparatus achieves the functions specified in the one or more flows in the flowcharts and/or one or more blocks in the block diagrams.

These computer program instructions may also be loaded in the computer or other programmable data processing devices, so that a series of operation steps are performed on the computer or other programmable data processing devices to generate processing achieved by the computer, and furthermore, steps for achieving the specified functions in the one or more flows in the flowcharts and/or one or more blocks in the block diagrams are provided according to the instructions executed on the computer or other programmable data processing devices.

In a typical configuration, a calculation device includes one or more processors (CPU), an input/output interface, a network interface and an internal memory.

The memory may include a volatile memory, a random access memory (RAM) and/or a non-volatile memory or other forms, such as a read-only memory (ROM) or a flash memory (flash RAM), in a computer readable medium. The memory is an example of the computer readable medium.

The computer readable medium includes persistent and non-persistent media as well as removable and non-removable media and is capable of achieving information storage by using any methods or technologies. Information may be a computer readable instruction, a data structure, a program module or other data. An example of a storage medium of the computer includes, but is not limited to a phase-changed random access memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, a compact disc read-only memory (CD-ROM), a digital video disk (DVD) or other optical memories and a magnetic cartridge tape, and a magnetic tape/magnetic disk storage devices or other magnetic storage devices or any other non-transmission media may be used for storing information that can be accessed by the calculation device. According to the definition described herein, the computer readable medium does not include transitory computer-readable media such as modulated data signals and carrier waves.

It should be further noted that terms "includes", "including", "comprising" and "comprises "or any other variants thereof are intended to cover non-exclusive inclusion, so that a process, method, commodity or device including a series of elements not only includes those elements, but also includes other elements not listed clearly, or further includes elements inherent to such a process, method, commodity or device. Under the condition that no more limitations are provided, elements defined by the word "including a . . . . . . " do not exclude other same elements further existing in the process, method, commodity or device including the elements.

The above embodiments are merely the embodiments of the present application, but are not intended to limit the present application. Those skilled in the art can make various alterations and changes to the present application. Any modifications, equivalent replacements, improvements and the like made within the spirit and principle of the present application shall fall within the scope of the claims of the present application.

The invention claimed is:

1. A method for recognizing a mine microseismic event, wherein the method comprises:

monitoring historical microseismic data by a mine microseismic monitoring device; and performing the following steps by a calculation device:

converting the historical microseismic data monitored by the mine microseismic monitoring device into a microseismic waveform image, and then, converting the microseismic waveform image into a four-neighborhood microseismic waveform graph structure;

performing area defining on the microseismic waveform graph structure, and extracting a similar feature layer of any node in the microseismic waveform graph structure based on the defined area, wherein a feature of each node is represented by Red Green Blue (RGB) information of k similar nodes of the node, and the similar feature layer refers to k layers of similar nodes formed by arranging the k similar nodes in ascending order of similarity, wherein k is an integer greater than 1; and taking the microseismic waveform image as an input layer of an improved convolutional neural network model, and connecting the input layer with the similar feature layer, a convolutional layer, a pooling layer, a fully connected layer and an output layer to form a recognition model for recognizing the mine microseismic event, wherein the convolutional layer, the pooling layer, the fully connected layer, and the output layer are preconfigured for the improved convolutional neural network model sequentially.

2. The method for recognizing a mine microseismic event according to claim 1, wherein each node in the microseismic waveform graph structure is expressed as $v=[x, f]^T$, wherein $x=[u, v]$ represents pixel coordinates of the node, and $f=[R, G, B]$ respectively represents pixel values of three RGB channels corresponding to a pixel.

3. The method for recognizing a mine microseismic event according to claim 1, wherein performing area defining on the microseismic waveform graph structure comprises:

determining a pixel value of a diagonal node in the microseismic waveform graph structure by virtue of a first subgraph with a preset size;

judging whether an area corresponding to the subgraph is a blank area according to the determined pixel value; and defining a non-blank area in the microseismic waveform graph structure as an area for extracting the similar feature layer.

4. The method for recognizing a mine microseismic event according to claim 3, wherein extracting a similar feature layer of any node in the microseismic waveform graph structure based on the defined area comprises:

selecting an extraction area defined by a second subgraph whose size is smaller than the size of the first subgraph in the defined area;

calculating similarities between any node in the extraction area and other nodes by adopting a non-recursive SimRank algorithm; and determining the similar feature layers of the corresponding nodes according to a size order of the calculated similarities.

5. The method for recognizing a mine microseismic event according to claim 1, wherein the convolutional layer $$C_{m,n}^{p,q}$$

is configured to comprise a feature map which is composed of a plurality of neurons, and the feature map of the convolutional layer $$C_{m,n}^{p,q}$$

is expressed as the following formula:

$$C_{m,n}^{p,q} = \sigma\left(\sum_{m=1}^{m}\sum_{n=1}^{n} I_{(m-u,n-v)} K_{u,v}^{p,q} + b^{p,q}\right)$$

wherein $b^{p,q}$ represents a bias value corresponding to the feature map, $\sigma$ represents an ReLU function, $$k_{u,v}^{p,q}$$

represents a convolution kernel, and $I_{(m-u, n-v)}$ represents a pixel position where the convolution kernel is located.

6. The method for recognizing a mine microseismic event according to claim 1, wherein the pooling layer is configured to:
divide the feature map input to the pooling layer from the convolutional layer into a plurality of local areas, and determine an average value or maximum value of all the neurons within each local area for output.

7. The method for recognizing a mine microseismic event according to claim 1, wherein the number of the convolutional layers, the pooling layers and the fully connected layers is one or more, and the number of combined layers of the convolutional layers and the pooling layers which are connected ahead the fully connected layers is one or more.

8. The method for recognizing a mine microseismic event according to claim 1, wherein all the neurons in the fully connected layer are fully connected with all the neurons of a pooling layer ahead the fully connected layer, and the connection between the fully connected layer and the pooling layer ahead the fully connected layer may be further achieved by:
cascading and converting an output feature map of the pooling layer ahead the fully connected layer into a vector with an adaptive length, and taking the vector as an input of the fully connected layer.

9. The method for recognizing a mine microseismic event according to claim 1, wherein after the recognition model for recognizing the mine microseismic event is formed, the method for recognizing a mine microseismic event further comprises the following steps by the calculation device:
correcting weights and biases of a plurality of model parameters of the formed recognition model; and
testing the corrected model by using a preset test set, and processing the real-time microseismic waveform image by using the recognition model tested to be qualified so as to recognize the microseismic event.

10. The method for recognizing a mine microseismic event according to claim 9, wherein correcting weights and biases of a plurality of model parameters of the formed recognition model comprises:
performing forward propagation training on the recognition model to obtain an output error of the recognition model; and
performing back propagation training on the output error, and applying a random gradient descent algorithm in the back propagation training to correct the weights and the biases of the recognition model.

11. A system for recognizing a mine microseismic event, wherein the system comprises:
a mine microseismic monitoring device for monitoring historical microseismic data,
a processor, a memory and a program stored on the memory and capable of running on the processor, and the program is executed by the processor to implement the following steps:
converting the historical microseismic data into a microseismic waveform image, and then, converting the microseismic waveform image into a four-neighborhood microseismic waveform graph structure;
performing area defining on the microseismic waveform graph structure, and extracting a similar feature layer of any node in the microseismic waveform graph structure based on the defined area, wherein a feature of each node is represented by Red Green Blue (RGB) information of k similar nodes of the node, and the similar feature layer refers to k layers of similar nodes formed by arranging the k similar nodes in ascending order of similarity, wherein k is an integer greater than 1; and
taking the microseismic waveform image as an input layer of an improved convolutional neural network model, and connecting the input layer with the similar feature layer, a convolutional layer, a pooling layer, a fully connected layer and an output layer which are to form a recognition model for recognizing the mine microseismic event,
wherein the convolutional layer, the pooling layer, the fully connected layer, and the output layer are preconfigured for the improved convolutional neural network model sequentially.

12. The system for recognizing a mine microseismic event according to claim 11, wherein each node in the microseismic waveform graph structure is expressed as $v=[x, f]^T$, wherein $x=[u, v]$ represents pixel coordinates of the node, and $f=[R, G, B]$ respectively represents pixel values of three RGB channels corresponding to a pixel.

13. The system for recognizing a mine microseismic event according to claim 11, wherein the convolutional layer $$C_{m,n}^{p,q}$$

is configured to comprise a feature map which is composed of a plurality of neurons, and the feature map of the convolutional layer $$C_{m,n}^{p,q}$$

is expressed as the following formula:

$$C_{m,n}^{p,q} = \sigma\left(\sum_{m=1}^{m}\sum_{n=1}^{n}I_{(m-u,n-v)} \cdot K_{u,v}^{p,q} + b^{p,q}\right)$$

wherein $b^{p,q}$ represents a bias value corresponding to the feature map, σ represents an ReLU function, $k_{u,v}^{p,q}$ represents a convolution kernel, and I(m-u,n-v) represents a pixel position where the convolution kernel is located.

14. The system for recognizing a mine microseismic event according to claim 11, wherein the pooling layer is configured to:
   divide the feature map input to the pooling layer from the convolutional layer into a plurality of local areas, and determine an average value or maximum value of all the neurons within each local area for output.

15. The system for recognizing a mine microseismic event according to claim 11, wherein the number of the convolutional layers, the pooling layers and the fully connected layers is one or more, and the number of combined layers of the convolutional layers and the pooling layers which are connected ahead the fully connected layers is one or more.

16. The system for recognizing a mine microseismic event according to claim 11, wherein all the neurons in the fully connected layer are fully connected with all the neurons of a pooling layer ahead the fully connected layer, and the connection between the fully connected layer and the pooling layer ahead the fully connected layer may be further achieved by:
   cascading and converting an output feature map of the pooling layer ahead the fully connected layer into a vector with an adaptive length, and taking the vector as an input of the fully connected layer.

17. The system for recognizing a mine microseismic event according to claim 11, wherein after the recognition model for recognizing the mine microseismic event is formed, the program is also executed by the processor to further implement:
   correcting weights and biases of a plurality of model parameters of the formed recognition model; and
   testing the corrected model by using a preset test set, and processing the real-time microseismic waveform image by using the recognition model tested to be qualified so as to recognize the microseismic event.

18. The system for recognizing a mine microseismic event according to claim 17, wherein correcting weights and biases of a plurality of model parameters of the formed recognition model comprises:
   performing forward propagation training on the recognition model to obtain an output error of the recognition model; and
   performing back propagation training on the output error, and applying a random gradient descent algorithm in the back propagation training to correct the weights and the biases of the recognition model.

19. The system for recognizing a mine microseismic event according to claim 11, wherein performing area defining on the microseismic waveform graph structure comprises:
   determining a pixel value of a diagonal node in the microseismic waveform graph structure by virtue of a first subgraph with a preset size;
   judging whether an area corresponding to the subgraph is a blank area according to the determined pixel value; and
   defining a non-blank area in the microseismic waveform graph structure as an area for extracting the similar feature layer.

20. The system for recognizing a mine microseismic event according to claim 19, wherein extracting a similar feature layer of any node in the microseismic waveform graph structure based on the defined area comprises:
   selecting an extraction area defined by a second subgraph whose size is smaller than the size of the first subgraph in the defined area;
   calculating similarities between any node in the extraction area and other nodes by adopting a non-recursive SimRank algorithm; and
   determining the similar feature layers of the corresponding nodes according to a size order of the calculated similarities.

* * * * *